United States Patent
Roy et al.

(10) Patent No.: US 10,341,084 B2
(45) Date of Patent: Jul. 2, 2019

(54) METHOD AND DEVICE FOR SYNCHRONIZING DATA, METHOD AND DEVICE FOR GENERATING A FLOW OF DATA, AND CORRESPONDING COMPUTER PROGRAMS

(71) Applicants: TDF, Montrouge (FR); ENENSYS TECHNOLOGIES, Cesson Sevigne (FR)

(72) Inventors: Jean-Roger Roy, Nomeny (FR); Benoit Chauviere, Pace (FR)

(73) Assignees: TDF, Cesson-Sevigne (FR); ENENSYS TECHNOLOGIES, Cesson-Sevigne (FR)

( * ) Notice: Subject to any disclaimer, the term of this patent is extended or adjusted under 35 U.S.C. 154(b) by 0 days.

(21) Appl. No.: 15/301,859

(22) PCT Filed: Apr. 3, 2015

(86) PCT No.: PCT/EP2015/097013
§ 371 (c)(1),
(2) Date: Oct. 4, 2016

(87) PCT Pub. No.: WO2015/150587
PCT Pub. Date: Oct. 8, 2015

(65) Prior Publication Data
US 2017/0126393 A1    May 4, 2017

(30) Foreign Application Priority Data
Apr. 4, 2014  (FR) ..................... 14 53013

(51) Int. Cl.
*H04L 7/00* (2006.01)
*H04H 20/67* (2008.01)
(Continued)

(52) U.S. Cl.
CPC .......... *H04L 7/0091* (2013.01); *H04H 20/67* (2013.01); *H04W 24/02* (2013.01); *H04W 56/001* (2013.01); *H04W 88/04* (2013.01)

(58) Field of Classification Search
CPC ... H04W 24/02; H04W 56/001; H04W 88/04; H04L 27/2602; H04L 27/2657; G01S 19/13
(Continued)

(56) References Cited

U.S. PATENT DOCUMENTS

2011/0055414 A1    3/2011  Masse et al.
2013/0300541 A1*  11/2013  Pesonen ............... G01S 5/0289
                                                      340/10.1

FOREIGN PATENT DOCUMENTS

DE       19723497 A1    12/1998
EP        2420902 A2     2/2012
(Continued)

OTHER PUBLICATIONS

International Preliminary Report on Patentability and English translation of the Written Opinion dated Oct. 4, 2016 for corresponding International Application No. PCT/EP2015/097013, filed Apr. 3, 2015.
(Continued)

*Primary Examiner* — Leila Malek
(74) *Attorney, Agent, or Firm* — David D. Brush; Westman, Champlin & Koehler, P.A.

(57) ABSTRACT

A method for synchronizing data, via a broadcast network, which includes at least one fixed transmitter and a plurality of broadcast sites. The synchronization method uses the following acts, at at least one of the broadcast sites: obtaining a delay, referred to as an absolute delay, determined from the geographic location of the broadcast site; determining an additional delay, by subtracting the absolute delay from a fixed delay shared by the broadcast sites in the network; resetting at least one time datum or at least one portion of a data stream from the fixed transmitter, applying the additional delay to the time datum or to the portion of the data stream.

12 Claims, 6 Drawing Sheets

Figure 1:
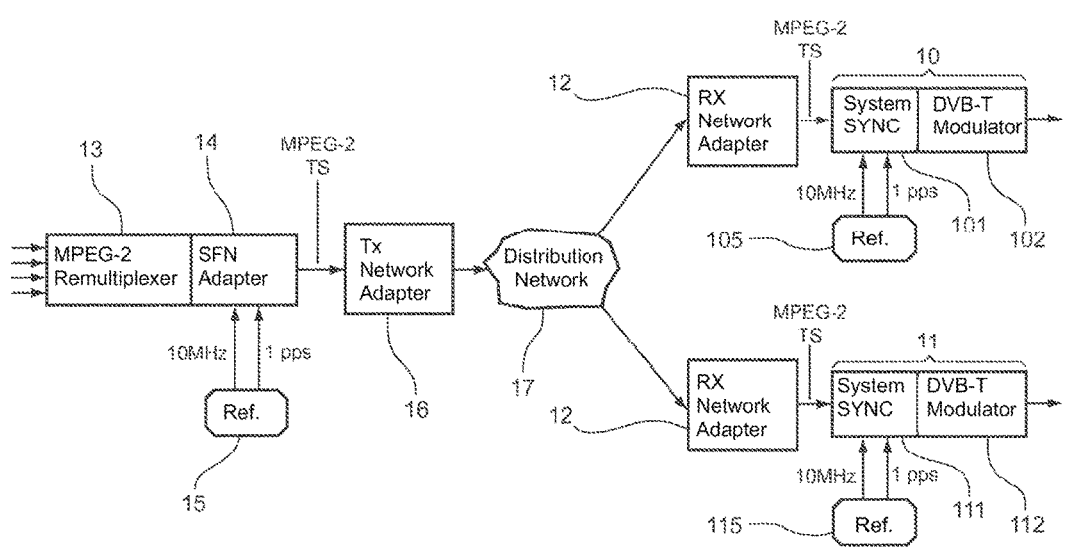

(51) Int. Cl.
*H04W 56/00* (2009.01)
*H04W 88/04* (2009.01)
*H04W 24/02* (2009.01)

(58) Field of Classification Search
USPC .......................................................... 375/355
See application file for complete search history.

(56) References Cited

FOREIGN PATENT DOCUMENTS

EP          2582162 A1   4/2013
WO     2009103638 A1   8/2009

OTHER PUBLICATIONS

English translation of the French Written Opinion for corresponding French Application No. FR1453013, filed Apr. 4, 2014.
International Search Report and Written Opinion dated Jun. 19, 2015 for International Application No. PCT/EP2015/097013, filed Apr. 3, 2015.
English Translation of the International Search Report and Written Opinion dated Jun. 19, 2015 for International Application No. PCT/EP2015/097013, filed Apr. 3, 2015.
European Office Action, with corresponding machine translation, dated Jan. 31, 2019 for corresponding European Application No. 15713966.8-1207.

* cited by examiner

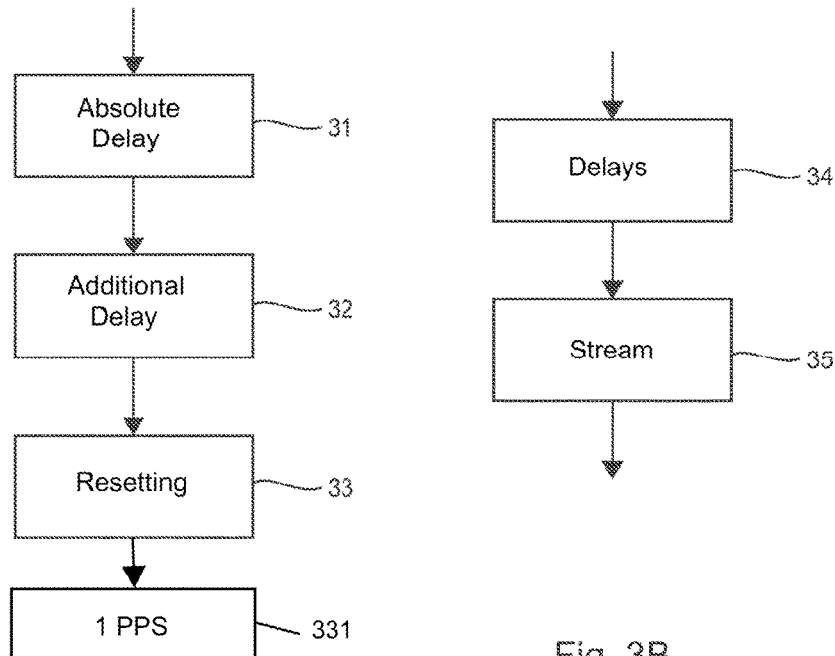
Fig. 3A
Fig. 3B
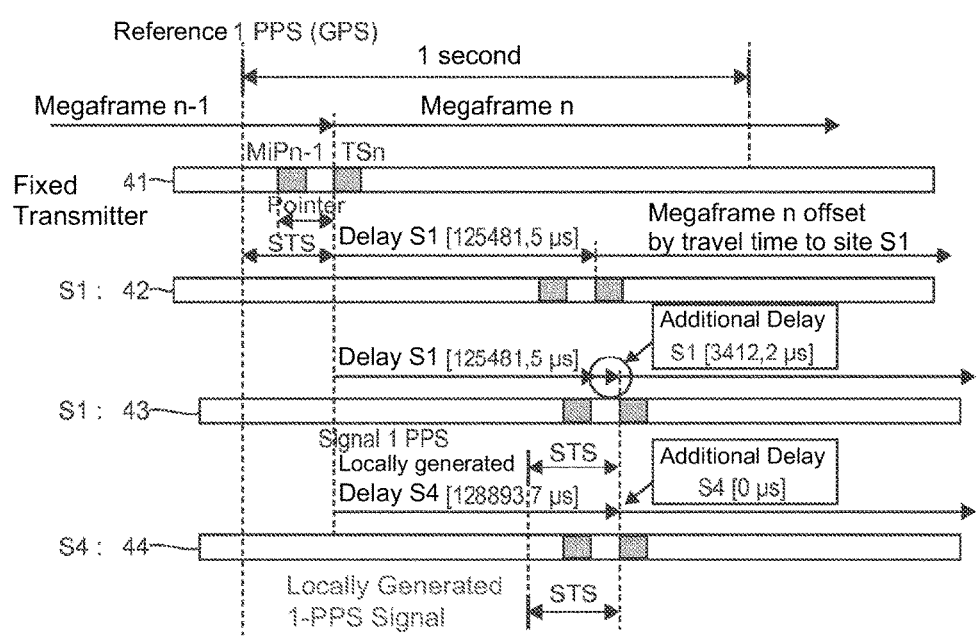
Fig. 4

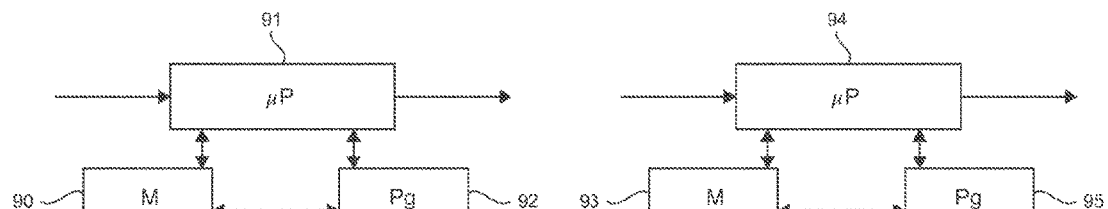
Fig. 9                                                Fig. 10
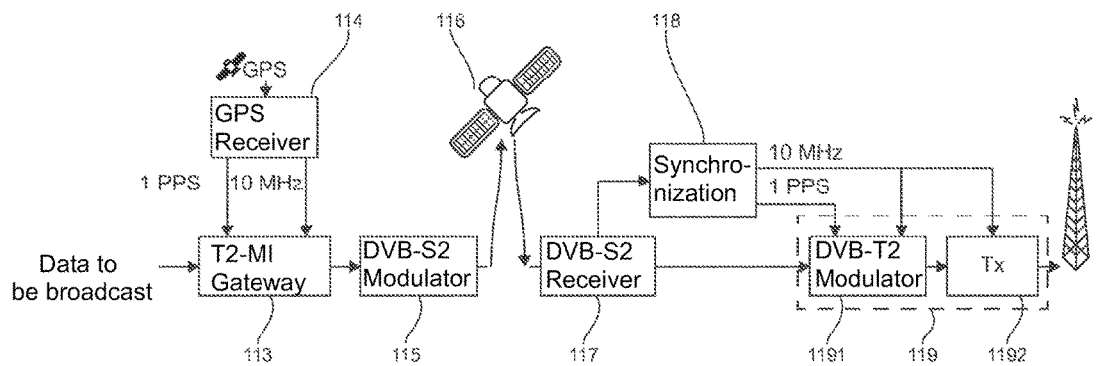
Fig. 11

METHOD AND DEVICE FOR SYNCHRONIZING DATA, METHOD AND DEVICE FOR GENERATING A FLOW OF DATA, AND CORRESPONDING COMPUTER PROGRAMS

CROSS-REFERENCE TO RELATED APPLICATION

This Application is a Section 371 National Stage Application of International Application No. PCT/EP2015/097013, filed Apr. 3, 2015, the content of which is incorporated herein by reference in its entirety, and published as WO 2015/150587 on Oct. 8, 2015, not in English.

1. FIELD OF THE INVENTION

The field of the invention is that of the transmission and broadcasting of information, especially television, radio or time-related information in a broadcasting network comprising at least one fixed reference site, also called a fixed transmitter, and a plurality of broadcasting sites. Such a fixed transmitter is, for example, a long-wave, teleport or other type of transmitter.

More specifically, the invention concerns the synchronization of different broadcasting sites and proposes a technique to compensate for delays due to the geographical positions of the different broadcasting sites, and possibly variably delays due to the drifting of a satellite-type intermediate transmission device.

The invention can be applied more particularly but not exclusively to SFN (Single Frequency Network) type networks whatever the broadcasting standard used:
DVB-T or DVB-T2 (Digital Video Broadcasting—Terrestrial);
DVB-H (Digital Video Broadcasting—Handheld);
DAB (Digital Audio Broadcasting);
DMB (Digital Multimedia Broadcasting);
LTE (Long-Term Evolution) and especially eMBMS (evolved Multimedia Broadcast/Multicast Service);
etc.

2. PRIOR ART

We shall strive more particularly here in the document to address a set of problems and issues existing in the field of digital terrestrial television broadcasting networks also called DTT or DTTV (digital terrestrial television) networks. The invention is naturally not limited to this particular field of application but is of utility for any technique of transmission or for broadcasting information having to face proximate or similar problems and issues and especially broadcasting networks using the DVB-T or DVB-T2 standards.

Such digital terrestrial television broadcasting networks are presently deployed in France, Europe and in many other countries in the world. These networks can be of the MFN (MultiFrequency Network) type, meaning that the different broadcasting sites work at separate frequencies or SFN type frequencies or isochrones frequencies, meaning that the different broadcasting sites must be very precisely synchronized in time, frequency and content.

Owing to this imperative of time and frequency synchronization of the different broadcasting sites, it is proving to be particularly difficult to implement such SFN networks.

Several methods have been proposed to date for synchronizing DVB-T signals at the output of the broadcasting sites of a DTT broadcasting network.

By way of an example, FIG. 1 illustrates a block diagram of an SFN type DVB-T broadcasting system implementing a broadcasting of data in the MPEG-2-TS (Motion Picture Expert Group—Transport Stream) format.

This FIG. 1 show two transmitters, 10 and 11, located in two separate broadcasting sites, each comprising a synchronizing module (SNYC system) 101, 111 and a DVB-T modulator 102, 112. The synchronization module 101, 111 is fed with two frequency and time reference signals, for example one signal corresponding to one pulse per second or 1 pps and one signal at 10 MHz resulting from the 1-pps signal. It will be noted that there are exactly 10 million periods of the 10 MHz frequency reference signal between two 1-pps pulses.

These signals can come from any reliable reference system 105 and 115 based for example on the American GPS (Global Positioning System), the European Galileo System or the Russian Glonass.

This 10 MHz frequency reference signal can also be used at the head-end by an SFN adapter to calibrate its output bit rate so that it is stable and accurate as well as by transmitters of broadcasting sites to calibrate their bit rate.

This reference can also be used by transmitters of broadcasting sites to synchronize their sending frequency which, for optimal operation, must be accurate to within less than 1 Hz in DTT in an SFN network.

The data to be broadcast by each of these transmitters 10, 11 are received in the form of an MPEG-2 TS type transport stream coming from a receiver 12 of the broadcasting sites, also playing the role of network adapter (RX Network Adapter).

Upstream, at the other end of the broadcasting sequence, the MPEG-2 TS data stream to be transmitted is built by an MPEG-2 multiplexer referenced 13 which puts the data into frames. Such an MPEG-2 multiplexer is situated for example in a national head-end from which the data to be broadcast by each of the transmitters 10, 11 of the broadcasting sites is then transported by satellite (in a transport network also called a transmission network). After MPEG-2 multiplexing 13, the data are processed by an SFN adapter 14 which carries out the temporal marking of the frames using the same time and frequency reference 15 as the reference 105, 115 used by the synchronization modules 101, 111 of the transmitters 10 and 11. The SFN adapter 14 is the counterpart, during transmission, of the synchronization module 101, 111 in reception. Thus, the SFN adapter is also fed with a 10 MHz frequency reference signal and a 1-pps time reference signal.

At output of the SFN adapter 14, the data stream is therefore of an MPEG-2 TS type: it is then transmitted by a network adapter 16 (TX Network adapter) and conveyed by a transport or distribution network 17 (for example a satellite transmission network) up to the receivers 12 of the broadcasting sites in order to be made available to the transmitters 10 and 11.

More specifically, the temporal marking carried out by the SFN adapter 14 consists firstly in building mega-frames and secondly in inserting a "Mega-frame Initialization Packet" or MIP at any unspecified location in each of these mega-frames.

The MIP of the mega-frame indexed n, denoted as $MIP_n$ is identified by its own PID (Packet Identifier) and comprises especially:

a two-byte word called a pointer which gives the number of data packets (TS packets) between the current MIP and the first TS packet of the next mega-frame;

a three-byte word called a synchronization time stamp or STS which gives the number of 10 MHz periods between the last 1-pps reference pulse preceding the start of the mega-frame indexed n+1 and the start of this next mega-frame indexed n+1 (identified by the first bit of the first packet of this mega-frame).

Figure 2:
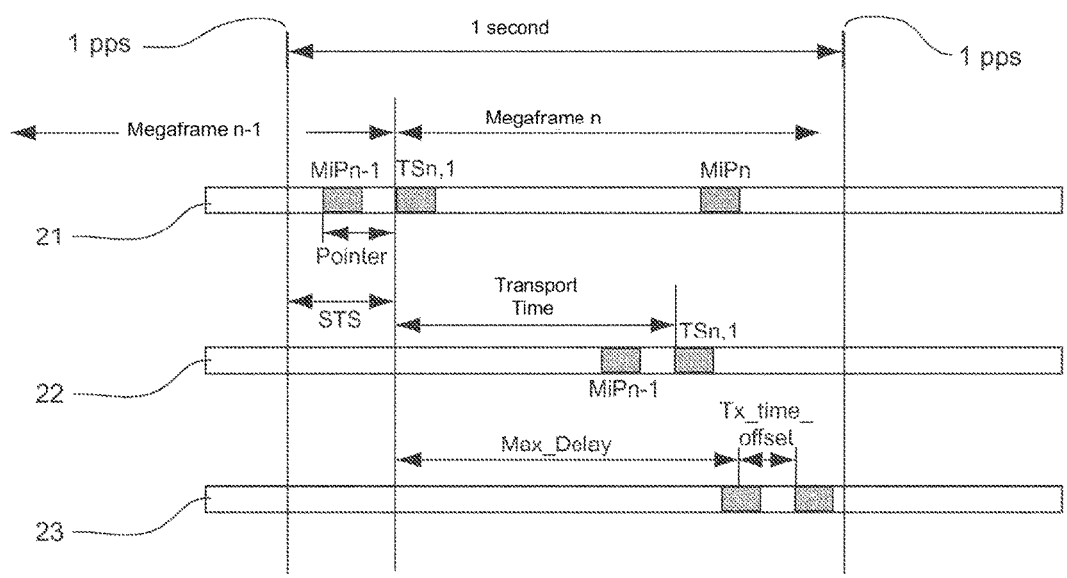

FIG. 2 more specifically illustrates these different notions for the:

the data stream at output of the head-end SFN adapter referenced 21;

the data stream at input of the modulator on the broadcasting site, referenced 22; and the modulated signal broadcast by the transmitter of the broadcasting site, referenced 23.

As indicated above, the SFN adapter 14 organizes the data stream 21 in mega-frames and inserts one and only one MIP packet per mega-frame ($MIP_{n-1}$ for the mega-frame n−1, $MIP_n$ for the mega-frame n).

At the transmitters 10, 11 of the broadcasting sites, the system SYNC module 101, 102 receives at its input firstly the MPEG-22 stream which has been transported in the network and secondly the 1-pps time reference and 10 MHz frequency reference coming for example from the GPS receiver.

It searches for the packet $MIP_{n-1}$.

Having found the packet $MIP_{n-1}$, it uses the "pointer" value to find the first packet 15 of the next mega-frame, referenced $TS_{n,1}$. The synchronization has thus been done at the bit level.

Having found the first packet $TS_{n,1}$, the system SYNC module 101, 102, uses the STS value and the 1-pps pulse to find the instant at which this first TS packet of the next mega-frame has exited the head-end SFN adapter. This corresponds to the transport time.

From this, the SYNC module 101, 102 finally deduces the instant of broadcast which corresponds to the instant of output from the head-end SFN adapter to which is added a controlled delay common to all the transmitters of the broadcasting sites (maximum delay or Max_Delay transported also in the MIP packets) as well as a delay which can be specific to each transmitter (TX_time_offset). This last-named parameter corresponds to a delay related to the engineering configuration of the broadcasting site.

In other words, the transmitters 10, 11 use the MIP signaling and a time reference (for example a 1-pps signal coming from a GPS) identical to the one used at the head-end transmitter to carry out a comparative analysis of the MIP signaling and of the STS time stamps, and take the decision to delay the received frame, to a greater or to a lesser extent, at output of the broadcasting site transmitter. Thus, this deterministic method, which relies on the same 1-pps time reference as at the head-end, carries out the temporal synchronization of the output signals from the transmitters of the broadcasting sites.

However, this synchronization is possible only if, on the one hand, the transport time is below the value Max_Delay (itself smaller than one second if we use the 1-pps time reference), and, on the other hand, the 1-pps time reference "pulses" i.e. sends out a pulse at the same instant in the different broadcasting sites.

The 1-pps time reference and the 10 MHz frequency reference must therefore be common at all points of the broadcasting sequence. They are therefore classically deduced from GPS reception.

To reduce equipment costs, it is now being sought to develop SFN networks that do not rely on the use of GPS receivers at each broadcasting site.

In particular, the patent application WO2009/103638 filed on behalf of TDF proposes a technique for synchronizing the different transmitters of a broadcasting network that does not require the use of a reliable time reference (coming for example from a GPS receiver) for each of its transmitters. This technique thus enables the use, in one and the same broadcasting network, of transmitters using a time reference coming from a reliable source as well as transmitters using a time reference coming from the data stream. To this end, it is determined, at the head-end side, that there is a time offset between two time references obtained according to distinct techniques, and a temporal marker is transmitted, this temporal marker being directly modified in the data stream sent by the head-end to take account of this offset, or else this time offset is transmitted to the different transmitters of the network so that the transmitters of the broadcasting sites modify their local time reference according to this offset.

The technique presented in the patent application WO2009/103638 removes the need for using GPS receivers at each broadcasting site under certain conditions, and especially when the distance between the head-end and the different broadcasting sites is substantially identical. Now, it turns out to be the case that certain SFN cell are very extensive and the distance between the head-end and the different broadcasting sites is not always substantially identical.

There is therefore a need for a novel technique of synchronization of the different transmitters of a broadcasting network that does not rely on the use of GPS receivers at each broadcasting site and is efficient even when the distance between the head-end and the different broadcasting sites varies. In particular, there is a need for a novel synchronization technique that can improve the technique presented in the patent application WO2009/103638.

3. SUMMARY OF THE INVENTION

The invention proposes a novel solution that does not have all these drawbacks of the prior art in the form of a method for synchronizing data in a broadcasting network comprising at least one fixed transmitter and a plurality of broadcasting sites.

According to the invention, the method of synchronizing implements the following steps in at least one of the broadcasting sites:

obtaining a delay, called an absolute delay, determined from the geographical position of the broadcasting site;

determining an additional delay, by subtraction of the absolute delay from a fixed delay common to the broadcasting sites of the network, the fixed delay corresponding to the maximum absolute delay determined from the geographical positions of the broadcasting sites of the network;

resetting a data stream coming from the fixed transmitter, applying the additional delay to at least one time information carried by the data stream or to at least one portion of the data stream, delivering a reset data stream.

The invention thus proposes a novel solution for the synchronization of the different transmitters of a broadcasting network (or of a cell of such a network), whatever the geographical position of the different broadcasting sites.

It makes it possible to compensate for the delays related to the different travel times between a fixed transmitter broadcasting a reference signal and the broadcasting sites, especially in the context of satellite transmission, and to achieve this result broadcasting site by broadcasting site.

According to a first example, such a fixed transmitter is a long-wave transmitter (of the type used by France Inter (RM) in France, DCF77(RM) in Germany, MSF(RM) in the United Kingdom, etc. Such a transmitter broadcasts time-related information (date and time) to the different broadcasting sites. According to this first example, it is this time information that is reset, broadcasting site by broadcasting site, by modifying the time information received by a particular broadcasting site to take account of the additional delay related to this broadcasting site.

According to a second example, such a transmitter is a teleport used especially for sending a data stream to a satellite in geostationary orbit.

In particular, according to the invention, no additional delay is added to the broadcasting site associated with the longest travel time from the fixed transmitter since the absolute delay for this broadcasting site is equal to the fixed delay.

According to a first embodiment, the absolute delay is equal to a travel time between the fixed transmitter and the broadcasting site and the fixed delay is equal to a maximum travel time among the different travel times between the fixed transmitter and each of the broadcasting sites of the network.

According to a second embodiment, the absolute delay is equal to a travel time between an intermediate transmission (and/or broadcasting) device and the broadcasting site, and the fixed delay is equal to a maximum travel time among the different travel times between the intermediate transmission device and each of the broadcasting sites of the network.

In particular, the intermediate transmission device is a geostationary satellite.

For example, the absolute delay corresponds, according to this second embodiment, to the absolute travel time calculated locally for each broadcasting site using the geographical coordinates of the site (latitude, longitude, altitude) and the nominal geostationary position of the satellite (latitude, longitude, altitude).

The fixed delay corresponds to the maximum value of the absolute delay (travel time) encountered on the network possibly weighted by the processing time inherent in the satellite receiver. This fixed delay is common to all the broadcasting sites and makes it possible especially for the 1-pps signals generated at the broadcasting sites to be synchronized with a 1-pps signal coming from a GPS receiver (at the reference position of the satellite, independently of spatial drift).

The additional delay therefore corresponds to the geographical compensation to be applied, computed locally for each broadcasting site from the two preceding parameters according to the relationship: additional delay=fixed delay–absolute delay.

According to one particular characteristic of the invention, the data stream comprises at least one field carrying the absolute delay and the step for obtaining implements a step for extracting the absolute delay from the data stream.

In particular, since the absolute and fixed delays defined previously are static data elements, they can be broadcast as private data in the data stream. Thus, if we consider a network comprising a fixed transmitter and two broadcasting sites S1 and S2, the data stream can have a first field carrying the absolute delay associated with the broadcasting site S1, a second field carrying the absolute delay associated with the broadcasting site S2 and possibly a third field carrying the fixed delay (since it is known that this fixed delay is equal to the maximum absolute delay among the absolute delays associated with the broadcasting site S1 and the broadcasting site S2, it does not imperatively have to be transmitted in a separate field).

According to one variant, these delays can be parametrized manually, for example in a synchronization device of each broadcasting site. Taking the above example, the absolute delay associated with the broadcasting site S1 can be parametrized in a synchronization device of the broadcasting site S1 and the absolute delay associated with the broadcasting site S2 can be parametrized in a synchronization device of the broadcasting site S2. The fixed delay for its part can be transmitted in the data stream or parametrized at each broadcasting site.

According to another characteristic of the invention, the method for synchronizing comprises a step for obtaining a time reference from the reset stream.

Such a time reference is for example of a 1-pps type and is synchronized between the different broadcasting sites of the network associated with such a synchronization device.

According to another characteristic of the invention, the synchronization method comprises a step for obtaining a 10 MHz frequency reference from the 1-pps time reference.

According to yet another characteristic of the invention, the broadcasting sites belong to a same cell of the SFN type in which the transmitters use a same sending frequency.

In another embodiment, the invention relates to a data synchronization device capable of being activated in a broadcasting network comprising at least one fixed transmitter and a plurality of broadcasting sites comprising:
  a module for obtaining a delay, called an absolute delay, determined from the geographical position of one of the broadcasting sites;
  a module for determining an additional delay, by subtraction of the absolute delay from a fixed delay common to the broadcasting sites of the network, the fixed delay corresponding to the maximum absolute delay determined from the geographical positions of the broadcasting sites of the network.
  a module for resetting a data stream coming from the fixed transmitter, applying the additional delay to at least one time information carried by the data stream or to at least one portion of the data stream, delivering a reset data stream.

Such a synchronization device is especially adapted to implementing the method of synchronization described above. Such a synchronization device could of course comprise the different characteristics of the method of synchronization according to the invention which can be combined or taken in isolation. Thus, the characteristics and advantages of this synchronization device are the same as those of the synchronization method and are not described in greater detail.

In particular, such a synchronization device can be integrated into a broadcasting site comprising a receiver and a transmitter which can be combined if necessary. The invention also relates to a method for generating a data stream to be transmitted in a broadcasting network comprising at least one fixed transmitter and a plurality of broadcasting sites implementing the following steps:
  obtaining at least one delay associated with one of the broadcasting sites, called an absolute delay, determined from the geographical position of the broadcasting site;

generating a data stream comprising at least one field carrying the absolute delay and at least one field carrying a fixed delay, said fixed delay being common to the broadcasting sites of the network and corresponding to the maximum absolute delay determined from the geographical positions of the broadcasting sites.

Such a method for generating a data stream is especially adapted to elaborating a data stream to be broadcast to the different broadcasting sites of the network, as described above.

In particular, such a method for generating a data stream also implements the following steps:

obtaining a first time reference from an external source;

obtaining a second time reference determined from a first transmission/reception of the data stream;

comparing the first and second time references in order to determine a time offset between the first and second time references;

inserting the time offset or at least one temporal marker modified as a function of the time offset in the data stream so as to compensate in real time for a variation of the transport time between the fixed transmitter and the broadcasting sites.

The invention according to this embodiment, thus proposes a novel technique for synchronizing the different transmitters of a broadcasting network that does not require the use of a reliable time reference (coming for example from the American GPS positioning system or the European Galileo system or the Russian Glonass system) at each of these transmitters. This technique enables the use, in a same broadcasting network, of the transmitters using a time reference coming from a reliable source as well as transmitters using a time reference coming from the data stream.

For example, the first time reference is a "one pulse per second" reference coming from a positioning system and the second time reference is a "one pulse per second" reference generated from the data stream.

According to one example of implementation, according to the DVB-T or DVB-T2 standard, the time offset or said at least one temporal marker is inserted by replacing a padding packet of the data stream by ghost or dummy packet, or by a packet for which the signaling does not modify the nature of the stream, i.e. the final service associated with the stream.

In particular, the packet or packets specific to the marking inserted into the stream before transmission can be filtered before the extraction of the temporal markers, i.e. at each transmitter, for example by again overwriting these packets with a padding packet. It can be noted that this filtering of packets specific to the marking is deterministic. Thus, in the context of an SFN type network, it does not modify the SFN aspect of the broadcast signal.

In another embodiment, the invention relates to a device for generating a data stream to be transmitted in a broadcasting network comprising at least one fixed transmitter and a plurality of broadcasting sites, comprising:

a module for obtaining at least one delay associated with one of the broadcasting sites, called an absolute delay, determined from the geographical position of the broadcasting site;

a module for generating a data stream comprising at least one field carrying the absolute delay and at least one field carrying a fixed delay, said fixed delay being common to the broadcasting sites of the network and corresponding to the maximum absolute delay determined from the geographical positions of the broadcasting sites.

Such a device for generating a data stream is especially adapted to implementing the method for generating a data stream described above. Such a device could of course comprise the different characteristics of the method for generating a data stream according to the invention, which can be combined or taken in isolation. Thus, the characteristics and advantages of this device are the same as those of the method for generating a data stream and are not described in more ample detail. In particular, such a device is a head-end of a broadcasting network.

The invention also relates to one or more computer programs comprising instructions for implementing a method of synchronization and/or a method for generating a data stream as described here above when this or these programs are executed by a processor.

The methods according to the invention can be implemented in various ways, especially in wired form or in software form.

This or these program can use any programming language whatsoever and can be in the form of a source code, object code or a code that is intermediate between source code and object code, such as in a partially compiled form or in any other desirable form.

4. LIST OF FIGURES

Figure 5:
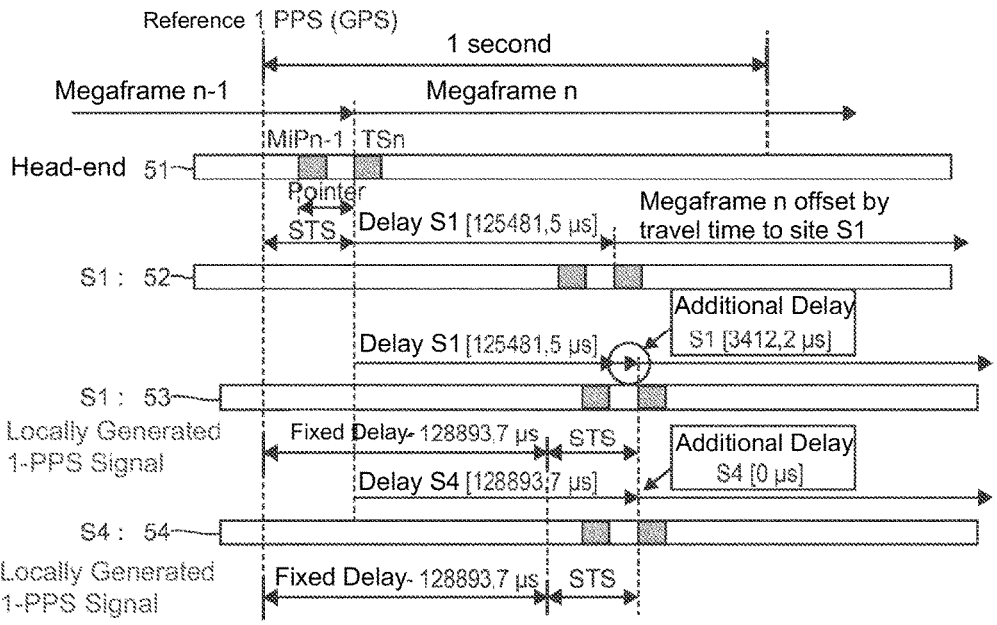
Figure 6:
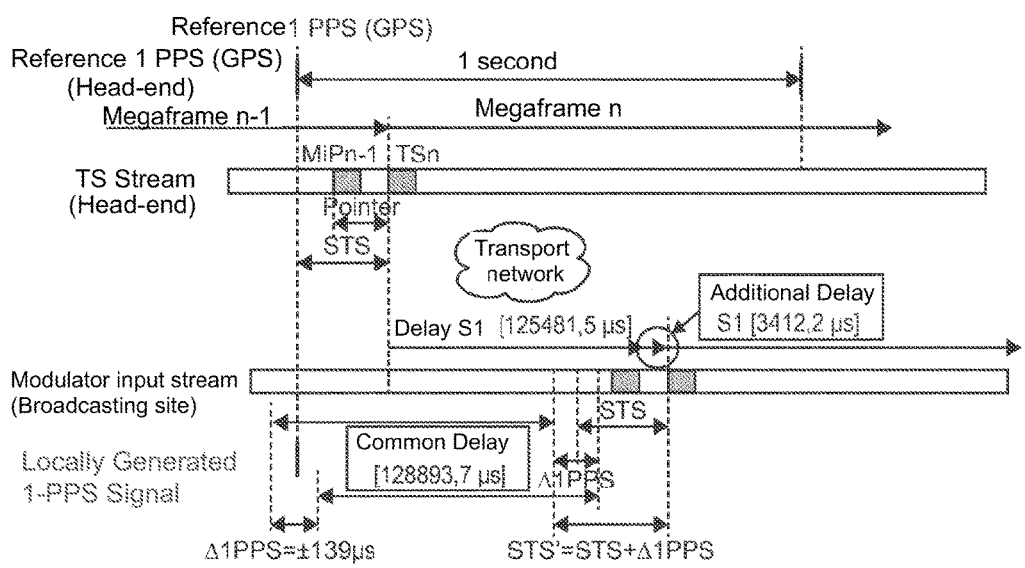
Figure 7:
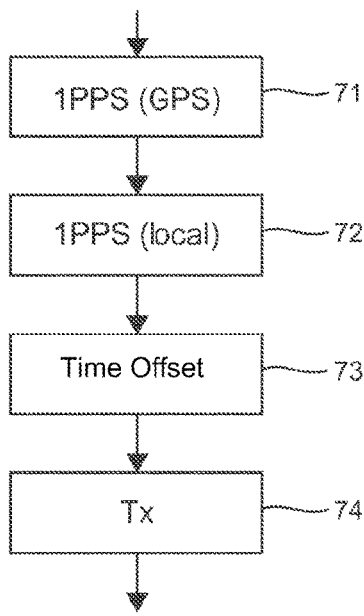
Figure 8:
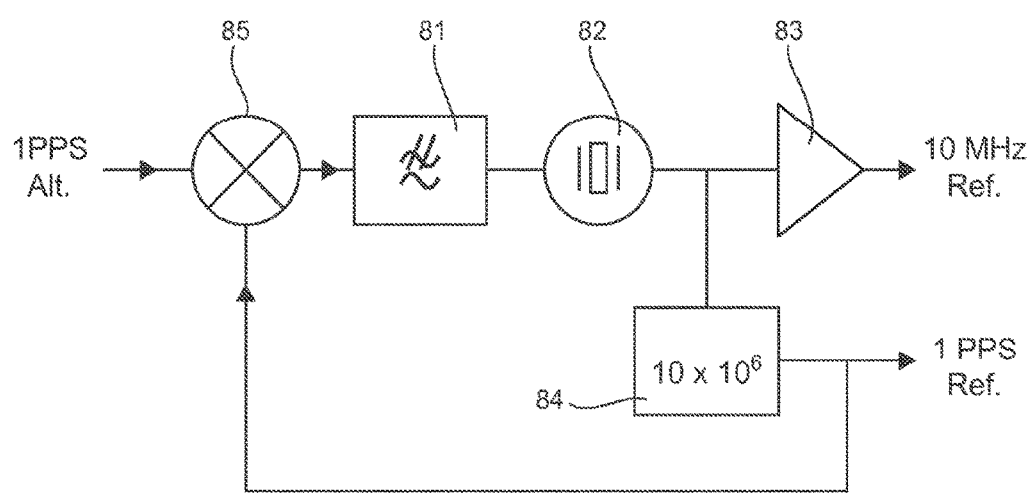

Other features and advantages of the proposed technique shall appear more clearly from the following description of a preferred embodiment, given by way of a simple illustratory and non-exhaustive example and from the appended drawings, of which:

FIG. 1, already described with reference to the prior art, is a block diagram of an SFN type DTT broadcasting system broadcasting data in the MPEG-2 format;

FIG. 2, also described with reference to the prior art, is an illustration in the form of a timing diagram of the principle of SFN synchronization implemented in the system of FIG. 1;

FIGS. 3A and 3B present the main steps of a method of synchronization and a method for generating a data stream according to the invention;

FIGS. 4, 5 and 6 illustrate different timing diagrams presenting the generation of a 1-pps time reference;

FIG. 7 presents the main steps of a method for generating a data stream implemented to compensate for satellite drift according to one particular embodiment of the invention;

FIG. 8 presents a technique for generating a 10 MHz frequency reference;

FIGS. 9 and 10 respectively illustrate examples of simplified structure of a device for generating a data stream implementing a technique for generating a data stream and a synchronization device implementing a technique of synchronization according to one particular embodiment of the invention;

FIG. 11 presents a broadcasting system for the broadcasting of data according to the DVB-T2 standard.

5. DESCRIPTION OF ONE EMBODIMENT OF THE INVENTION

5.1 General Principle

The general principle of the invention relies on the determining of a delay associated with a broadcasting site, because of the travel time associated with this broadcasting site and on compensating for this geographical delay that is implemented "broadcasting site by broadcasting site", thus synchronizing the different broadcasting sites of a broadcasting network.

The taking into account of this geographical delay, also called an absolute delay, makes it possible to compensate for the variations in the time taken to transport a reference signal between a fixed transmitter (of the long-wave, teleport or other similar type) and the different broadcasting sites, whatever the broadcasting standard implemented (DVB-T, DVB-T2, DAB, DMB, LTE, etc.).

FIG. 3A provides a more precise illustration of the general principle of the method of synchronization according to the invention, implemented in a broadcasting network comprising a fixed transmitter feeding at least two distinct broadcasting sites.

More specifically, FIG. 3A illustrates the steps implemented in a synchronization device located in a broadcasting site of the network. Preferably, such synchronization devices equip each broadcasting site of the network or a same network cell, for example a SFN cell.

Such a method of synchronization comprises a first step 31 for obtaining a delay, called an absolute delay, determined from the geographical position of the broadcasting site. Thus, at each broadcasting site, an absolute delay associated with the broadcasting site is obtained.

Such an absolute delay can be computed at the level of the broadcasting site and stored in a memory of the broadcasting site, for example in a memory of the synchronization device. As a variant, such an absolute delay can be computed at the fixed transmitter or at a head-end connected to the fixed transmitter and transmitted in a field of the data stream. It can be noted that such an absolute delay is determined at least once when the broadcasting site is put into service and can then if necessary be updated periodically or according to a variation of broadcasting conditions.

In a following step 32, an additional delay is determined, obtained for a broadcasting site by subtracting the absolute delay associated with this site from a fixed delay common to the different broadcasting sites of the network. The fixed delay is defined as the maximum absolute delay determined from the geographical positions of the broadcasting sites of the network.

In other words, for a given broadcasting site, the additional delay corresponds to the difference between the fixed delay and the absolute delay associated with the broadcasting site.

During a subsequent step 33, at least one time information (if the fixed transmitter broadcasts date and time type time-related information) or at least one portion of a data stream (if the fixed transmitter broadcasts data other than time-related information) is reset in taking account of the additional delay. More specifically, during this third step, the additional delay is added to the time information or a portion of the stream is reset with the additional delay, delivering a reset data stream.

5.2 Example of Implementation of the Invention

Here below, we present an example of an implementation of the invention in a broadcasting network implementing a national SFN cell comprising, on an extreme periphery, four broadcasting sites situated purely by way of an illustration at the following positions:

|  | Latitude North | Longitude East |
| --- | --- | --- |
| Broadcasting site S1 | 41.29° | −5.19° |
| Broadcasting siteS2 | 41.29° | 9.83° |
| Broadcasting siteS3 | 51.15° | −5.19° |
| Broadcasting siteS4 | 51.15° | 9.83° |

In this example, we also consider a broadcast implementing an intermediate transmission device such as the Eutelsat 5° W satellite (registered mark) between a fixed teleport type transmitter and the different broadcasting sites. From the satellite coverage area, it can be seen that the maximum absolute delay is obtained for the broadcasting site S4. In other words, the travel time from the satellite to the broadcasting site S4 is greater than the travel time from the satellite to the broadcasting site S1, S2 and S3 (the travel time from the fixed transmitter to the satellite is identical for these broadcasting sites). This maximum absolute delay is also called a fixed delay here below.

Conversely, the broadcasting site S1 is characterized by a minimum value on the absolute delay of the travel. In other words, the travel time from the satellite to the broadcasting site S1 is smaller than the travel time from the satellite to the broadcasting sites S2, S3 and S4.

In order to facilitate the computations of these delays, the conventional geographical coordinates (altitude, longitude and latitude) can be converted into a Cartesian geocentric referential system (x, y, z).

This conversion is done for the coordinates of the different broadcasting sites and for the coordinates of the satellite in geostationary orbit. Since the point of origin of the orthonormal reference is the center of the earth, the computations systematically use the radius of the earth (6,378 km for a reference altitude at sea level). The use of these Cartesian geocentric coordinates makes it possible thereafter to carry out algebraic computations on the vectors representing direction and distance between the satellite and the broadcasting site.

It can be noted that the latitude value chosen for the satellite is equal to 0° since the plane of the geostationary orbit has a zero inclination relative to the plane of the equator. The relationships that are used to carry out the conversion in a geocentric Cartesian reference system are presented below:

$x = \text{altitude} * \cos(\text{latitude}) * \cos(\text{longitude})$ $y = \text{altitude} * \cos(\text{latitude}) * \sin(\text{longitude})$ $z = \text{altitude} * \sin(\text{latitude})$ with altitude expressed in meters relative to the center of the earth and all the angular values being expressed in radians.

After conversion of the geographical coordinates of the position of the satellite into the Cartesian $(x_1, y_1, z_1)$ referential and conversion of the geographical coordinates of the position of a broadcasting site into the Cartesian $(x_2, y_2, z_2)$ referential, the distance between the satellite and the broadcasting site, and the associated travel time, can be easily deduced.

The following table provides a more precise view of the travel time between the satellite (in its geostationary position) and the different broadcasting sites where the "absolute delay" corresponds to the travel time between the satellite and the broadcasting site considered and the "relative delay" corresponds to the difference between the fixed delay and the absolute delay associated with the broadcasting site considered:

| | Satellite Longitude Eutelsat 5°W −5.0° East | |
|---|---|---|
| | Absolute delay | Relative delay |
| Broadcasting siteS1 | 125481.5 μs | −3412.2 μs |
| Broadcasting siteS2 | 126077.2 μs | −2816.5 μs |
| Broadcasting siteS3 | 128407.5 μs | −486.2 μs |
| Broadcasting siteS4 | 128893.7 μs | 0 μs |

It is sought, according to the invention, to compensate for the relative deviations in considering that the reference site is that one that which gives the maximum absolute delay (i.e. the broadcasting site S4 according to the example). The purpose is then to align the values of absolute delay on each site with the value of this maximum absolute delay.

The timing diagram of FIG. 4 illustrates this principle for the transmission of an MPEG-TS or MPEG2-TS transport stream according to the DVB-T standard. Naturally, it may be recalled that the invention is not restricted to the DVB-T standard but can be used to compensate for variations in transport time between a fixed transmitter and the different broadcasting sites whatever the broadcasting standard being implemented.

We therefore consider, at the output of the fixed transmitter, a data stream referenced 41 also called a transport stream TS, formed by mega-frames, each mega-frame carrying a mega-frame initialization packet or MIP. As described with reference to FIG. 2 of the prior art, the MIP packet of the mega-frame indexed n−1, denoted as $MIP_{n-1}$, is identified by its PID and comprises especially a word called a "pointer" which gives the number of data packets (TS packets) between the current MIP and the first TS packet of the following mega-frame and an STS word which gives the number of 10 MHz periods between the last 1-pps reference impulse preceding the start of the mega-frame indexed n and the start of this mega-frame indexed n (identified by the first bit of the first packet of this mega-frame).

The timing diagram of FIG. 4 also illustrates:
the data stream received by the broadcasting site S1 in satellite reception, reference 42;
the data stream reset by the broadcasting site S1, referenced 43;
the data stream received by the broadcasting site S4 in satellite reception, referenced 4.

More specifically, reception on the broadcasting site S4 is characterized by a maximum value on the absolute delay (128893.7 μs). In this respect, it is not necessary to introduce the additional delay to reset the data stream received at the broadcasting site S4.

Reception at the broadcasting site S1 is characterized by a minimum value on the absolute delay (125481.5 μs). The data stream is then available with a relative advance of 3412.2 μs, corresponding to the difference between the values of absolute delay between the broadcasting sites S4 and S1.

According to the invention, the data stream received on the broadcasting site S1 is reset by applying to it an additional delay of 3412.2 μs corresponding to the value of the relative advance.

A same procedure is carried out at the broadcasting sites S2 and S3 by applying an additional delay of 2816.5 μs and of 486.2 μs respectively to these sites.

It is thus possible to obtain a temporal alignment between the data stream on each of the broadcasting sites by resetting the data stream site by site to align them with the data stream received by the broadcasting site S4 in satellite reception.

In particular, as already indicated, it is possible to broadcast the absolute and fixed delays (which are static data elements) as private data in the data stream. Thus, the data stream can have a first field carrying the absolute delay associated with the broadcasting site S1, a second field carrying the absolute delay associated with the broadcasting site S2, a third field carrying the absolute delay associated with the broadcasting site S3 and a fourth field carrying the absolute delay associated with the broadcasting site S4. Given that the fixed delay is equal to the maximum absolute delay among the absolute delays associated with the broadcasting sites S1, S2, S3 and S4, this fourth field carries the fixed delay and it is not necessary to transmit it in a separate field. In this case, it is possible, at the device for generating a data stream (for example a head-end) to implement a step (34) for obtaining these different delays (by computation or reception of this information) and a step (35) for generating the data stream comprising these different fields illustrated in FIG. 3B.

According to one variant, these different values are stored at each broadcasting site that concerns them.

According to another variant, the use of an intermediate transmission device is optional. It is therefore possible to define the absolute delay as the travel time between the fixed transmitter and the broadcasting site (instead of the travel time between the intermediate transmission device and the broadcasting site) and to define the fixed delay as the maximum travel time between the fixed transmitter and each of the broadcasting sites of the network (instead of the maximum travel time between the intermediate transmission device and each of the broadcasting sites), according to the invention. For example, the fixed transmitter is of the long-wave transmitter type (France Inter(RM) in France, DCF77(RM) in Germany, MSF (RM) in the United Kingdom, etc.), broadcasting time-related information. In this case, the time information is reset site by site. For example, at the broadcasting site S1, an additional delay R1 is added to the time conveyed by the time information, at the broadcasting site S2, an additional delay R2 is added to the time conveyed by the time information, and at the broadcasting site S3, an additional delay R3 is added to the time conveyed by the time information.

Once the data stream has been reset at each broadcasting site, it is possible to generate 1-pps time references (331) strictly synchronous on each of the broadcasting sites, for example using the value STS if the operation is situated in the context of the DVB-T standard (or an equivalent piece of information if the operation is situated in the context of another standard). Indeed, it may be recalled that such a time stamp gives the number of 10 MHz periods between the last 1-pps reference pulse preceding the start of a mega-frame and the start of this mega-frame. As illustrated in FIG. 4, it is thus possible to obtain a 1-pps signal generated locally at each broadcasting site from the reset data stream and the value of the synchronization time stamp (STS).

For example, if the operation is situated at the broadcasting site S1, an additional delay of 3412.12 μs is applied to a time information on date and time of the data stream received and then this delayed time information is removed from the value STS so as to obtain a 1-pps signal at the broadcasting site S1.

5.3 Synchronization with a Time Reference Coming from an External Source

According to the embodiment presented here above implementing an intermediate transmission device, the relative delays are compensated for, broadcasting site by broadcasting site, thus generating 1-pps time references that are strictly synchronous on each of the broadcasting sites.

It is noted however that the 1-pps time reference thus generated is not necessarily synchronous with a time reference coming from an external source like the one delivered by a GPS receiver.

Here below, a variant of the invention is therefore proposed, enabling the synchronization of transmitters using a time reference coming from a reliable source and transmitters using a time reference generated from the data stream as presented here above.

According to a first example illustrated in FIG. 5, the satellite is considered to be precisely located at its geostationary reference position.

As in the timing diagram of FIG. 4, the timing diagram of FIG. 5 illustrates:
  the data stream broadcast by the fixed transmitter referenced 51;
  the data stream received by the broadcasting site S1 in satellite reception, referenced 52;
  the data stream reset by the broadcasting site S1, referenced 53;
  the data stream received by the broadcasting site S4 in satellite reception referenced 54.

On the basis of the value STS and in the context of the DVB-T standard (or an equivalent piece of information if the context is that of another standard), it is possible to generate 1-pps time references strictly synchronous with each of the broadcasting sites as explained above. By subtracting this time reference from the fixed delay common to all the broadcasting sites, it is possible to generate a 1-pps time reference at each broadcasting site synchronous with a 1-pps time reference coming from a reliable source such as a GPS receiver.

As illustrated in FIG. 5, it is thus possible to obtain a 1-pps signal generated locally at each broadcasting site, synchronous with a 1-pps signal generated from an external source, the reset data stream, the synchronization time stamp (STS) value and the fixed delay.

For example, at the broadcasting site S1, an additional delay of 3412.12 µs is applied to a time information on date and time of the data stream, and then the value STS and the fixed delay is removed from this time information so as to obtain a 1-pps signal at the broadcasting site S1 synchronous with a 1-pps signal generated from an external source.

According to a second example illustrated in FIG. 6, the satellite is considered to be capable of undergoing drift around its nominal position. For example, the satellite oscillates around its normal position by an indicative value of amplitude of ±0.05° on the value of longitude and by ±40 km on the value of altitude, either vertically or horizontally but never obliquely. This drift individually affects all the broadcasting sites inasmuch as each absolute delay is assigned a variation governed by a non-constant sine relationship.

In order to generate 1-pps time references synchronous at the different broadcasting site, synchronized with a 1-pps reference coming from a GPS receiver, this second example proposes to compensate also for the variation in transport time, due to satellite drift, between the head-end (or fixed transmitter) and the broadcasting sites.

To this end, in addition to the subtraction/offset of the fixed delay common to all the broadcasting sites proposed according to the first example, this second example proposes to compensate for the temporal variation due to the drift of the satellite by correcting a temporal marker of the data stream according to a time offset to be applied (for example an STS value according to the DVB-T standard) or by transmitting this time offset.

The main steps implemented to compensate for this temporal variation are illustrated in FIG. 7. It is assumed below that the fixed transmitter is a teleport located in immediate proximity to the head-end.

During a first step 71, a device for generating a data stream, for example a head-end, inputs firstly the data to be broadcast and secondly a first time reference obtained from an external source such as GPS receiver. It organizes the data in frames and inserts at least one temporal marker into the data stream. The stream thus marked travels through an uplink towards the satellite and is then retransmitted towards the different broadcasting sites.

At a step 72, the head-end receives the data stream transported by the satellite (travels from head-end to satellite and then satellite to head-end). From the temporal marker or markers present in this stream, a second time reference is obtained.

These first and second time references are then compared in a step 73 to determine a time offset between the first and second time references.

Finally, during a step 74, this time offset is transmitted to the different broadcasting sites or else taken into account to modify the temporal marker or markers in the subsequent part of the data stream transported to the different broadcasting sites.

More specifically, the modification of the temporal markers makes it possible to compensate, at the head-end, for the influence of the satellite movement so as to emulate the reception at the level of the broadcasting sites. It is also possible to transmit this time offset to the different broadcasting sites which could modify their local time reference as a function of this offset. In particular, these broadcasting sites can be of different types, some of them using a reliable external source to generate a time reference (GPS type) while others generate the time reference from the received data stream and therefore do not require the use of an external GPS type reference.

This technique also makes it possible to compensate for the variations in the transport time between the head-end/teleport and the different broadcasting sites due to the drift of the satellite. It is described in greater detail in the above-mentioned patent application WO2009/103638 filed on behalf of TDF.

According to this embodiment of the invention, this technique is combined with a technique of compensating for geographical delays implemented broadcasting site by broadcasting site, thus enabling the synchronization of the different broadcasting sites of a broadcasting network and compensating for all the variations in the transport time between the head-end/fixed transmitter and the different broadcasting sites whatever the broadcasting standard implemented (DVB-T, DVB-T2, DAB, DMB, LTE, etc.).

For example, the invention proposes to compensate for the temporal variation related to the drift of the satellite by correcting the value STS contained in a MIP packet.

According to this example, during a first initialization phase, the data stream to be broadcast is organized in mega-frames comprising one or more MIP packets. These MIP packets carry a synchronization time stamp STS computed according to the 1-pps time reference coming from the GPS receiver, denoted as 1 pps (GPS). The data stream thus built is broadcast in the transport network. During a second operating phase, the data stream transported is received by the satellite reception means of the head-end or the teleport.

A new 1-pps time reference denoted as 1 pps (TS) is generated from the data stream received.

The 1-pps (TS) time reference and the 1-pps (GPS) time reference are then compared, determining the 1-pps time difference or offset Δ between these two references. In other words, the Δ 1 pps information is determined at the head-end by comparing the time difference existing through the MIP marker conveyed in the data stream (or ASI stream in satellite reception) with the 1-pps reference coming from a GPS receiver. It can be noted that the receiver of the head-end has a deterministic character with a processing time identical to that of the receivers disposed on all the broadcasting sites.

When the data is being put into frames, according to a first embodiment, the SFN adapter of the head-end modifies the STS value in the MIP packets, in taking account of this Δ 1-pps time offset. In other words, the value of the STS time stamp, previously calculated according to the 1-pps (GPS) time reference, is modified in adding the time offset to it such that:

STS'=STS+Δ1-pps.

The variable Δ 1-pps corresponds here to the instantaneous variation of the travel time prompted by the satellite drift, in terms of opposite algebraic value. If the satellite drift imposes a lengthening of the duration of the travel time by "x" μs, the value Δ 1 pps will be "−x" μs and vice-versa.

This new value STS' is inserted into the MIP packets. This time offset is therefore taken into account to modify the temporal marker or markers in the following part of the data stream transported to the different broadcasting sites.

At the different broadcasting sites, first of all the technique of compensation of the geographical delay is applied site by site as illustrated in FIG. 6. Then, the value STS' is used to generate 1-pps time references rigorously synchronous with each of these broadcasting sites. These values are subtracted/offset from the fixed delay common to all the broadcasting sites to generate a 1-pps time reference at each broadcasting site that is synchronous with the 1-pps (GPS) time reference.

Thus, the common fixed delay value is preserved along with the additional delay value to be taken into account for the site concerned (for example 3412.2 μs for the broadcasting site S1)

According to a second embodiment, in order to remain compatible with an SFN synchronization based on GPS receivers, the STS value contained in the MIP packet coming from the head-end is not modified. The value Δ 1 pps representing the temporal difference can be transmitted in a dedicated ghost or dummy packet identifier (PID). This encapsulation enables transparency in the modulator of a broadcasting site situated downstream and enables it to be used by a synchronization device as described above.

The time offset can thus be inserted into a TS packet having a dedicated PID, for example by replacing a padding packet of the stream by a packet identified by a dummy PID, i.e. a packet with a PID that is not described in the tables and is not reserved by the standard. According to one variant, this time offset is inserted by replacing a padding packet of the stream by a packet, the signaling of which does not modify the nature of the signal to be broadcast.

According to this second embodiment, the broadcasting site is deemed to know the packets specific to the marking carrying the dummy time offset (PID or packets for which the signaling does not modify the nature of the signal to be broadcast).

Several time offset values can also be inserted into this stream by introducing packets specific to the marking in each of the mega-frames.

This step of insertion is for example implemented by a modified MIP inserter.

At the broadcasting sites, an extraction module is planned enabling the extraction of the time offset measured at the head-end, in the packets specific to the marking.

First of all, the technique of compensation for the geographical delay is applied site by site as illustrated in FIG. 6. Then, the STS value is used to generate a 1-pps time reference that is subtracted/offset from the fixed delay common to all the broadcasting sites to generate a 1-pps time reference at each broadcasting site, and then the extracted time offset is added to this time reference thus delivering a compensated 1-pps time reference.

The compensated 1-pps time reference is then aligned with the 1-pps (GPS) time reference through the compensation of the Δ 1-pps time offset.

According to one variant, it is also possible to insert one or more modified temporal markers as described with reference to the first embodiment in one or more TS packets specific to the marking. For example, these packets specific to the marking are identified by a dummy PID, or by a packet for which the signaling does not modify the nature of the signal to be broadcast.

Thus, packets are created that are specific to the marking (dummy MIP for example) bearing for example an STS' value (STS'=STS+Δ 1-pps) co-existing in the data stream with "classic" MIP packets carrying an STS value.

This step of insertion is implemented for example by a slightly modified MIP inserter enabling the introduction of packets specific to the marking in the MPEG-TS stream.

The stream of data conveyed from the head-end/teleport towards the different broadcasting sites therefore possesses a double temporal marking:
  the classic MIP marking used by the modulator;
  the specific MIP marking, transparent for the modulators and used only by the synchronization device in each broadcasting site to generate a 1-pps reference aligned with the 1-pps reference coming from a reliable source (GPS).

For example, it is possible to inform to the broadcasting site (especially a synchronization device) about the PID of the dummy MIP packets that it must use to generate its 1-pps reference.

Again, at the different broadcasting sites, the technique of compensation for the geographical delay is first of all applied site by site as illustrated in FIG. 6. Then, the value STS' is used to generate 1-pps time references strictly synchronous with each of the broadcasting sites, which are then subtracted/offset from the fixed delay common to all the broadcasting sites to generate, at each broadcasting site, a 1-pps time reference synchronous with the 1-pps (GPS) time reference.

Naturally, all the embodiments presented in the patent application WO2009/103638 mentioned above can be combined with the geographical delay compensation technique, implemented broadcasting site by broadcasting site, thus enabling synchronization of the different broadcasting sites of a broadcasting network and compensating for all the variations of the transport time between the head-end and the different broadcasting sites. These different embodiments are not repeated in detail herein.

In addition, the invention can be applied whatever the broadcasting standard implemented, provided that it is possible to extract time synchronization information from the data stream, as a temporal marker.

5.4 Frequency Synchronization

As described above, it is possible to compensate for all the variations in the transport time between the fixed transmitter and the different broadcasting sites and generate a 1-pps time reference according to the invention.

It is also possible, according to the invention, to obtain a reliable 10 MHz reference frequency signal, by deriving this reference not from the rate of the data stream but rather from the 1-pps time reference generated according to the invention.

FIG. 8 illustrates an example of the automatic feedback control of the 10 MHz reference frequency signal from the 1-pps time reference signal generated according to the invention.

According to this example, the 1-pps time reference generated according to the invention, denoted as 1 pps alt, is filtered 81 then subjected to an oscillator 95, for example a 10 MHz OCXO type oscillator (Oven Controlled X-tal (Crystal) Oscillator). The signal output from the oscillator is stored in a register 83 delivering a 10 MHz frequency reference signal. Every 10,000,000 periods (counter $10 \times 10^6$, reference 84), a 1-pps time reference signal is delivered and re-injected into a module 85 used to compare the phase/frequency of this reliable 1-pps time reference signal with the phase/frequency of this time reference signal 1 pps alt.

It can be noted that the optimizing of the filtering characteristics of the control feedback loop enables the absorption and smoothing of the variations that affect the 1-pps reference generated according to the invention (coming from the proposed alternative synchronization module). The final purpose is to have, at output, reference signals with improved precision, provided especially by the use of an OCXO type oscillator.

5.5 Structures of the Device for Generating a Data Stream and the Synchronization Device Below, referring to FIGS. 9 and 10, we present examples of a simplified structure of a device for generating a data stream and a synchronization device implementing a technique for generating a data stream or synchronization technique according to one embodiment described here above. These FIGS. 9 and 10 illustrate only a particular way, among several other possible ways, of obtaining the different embodiments described in detail here above.

The device for generating a data stream illustrated in FIG. 9 comprises a RAM 90, a processing unit 91 equipped for example with a processor and driven by a computer program stored in a ROM 92, implementing the method for generating a data stream according to one embodiment of the invention.

At initialization, the code instructions of the computer program 92 are for example loaded into the RAM 90 and then executed by the processor of the processing unit 91. The processing unit 91 inputs data to be broadcast. The processor of the processing unit 91 implements the steps of the method for generating a data stream described above, according to the instructions of the computer program 92, to insert the values of absolute delays linked to the different broadcasting sites in the data stream. To this end, the device for generating the data stream at the head-end comprises, in addition to the memory 90, a module for obtaining at least one absolute delay associated with one of the broadcasting sites and a module for generating a data stream comprising at least one field carrying the absolute delay and at least one field carrying a fixed delay corresponding to the maximum absolute delay. These modules are driven by the processor of the processing unit 91.

The synchronization device illustrated in FIG. 10 comprises a RAM 93, a processing unit 94, equipped for example with a processor and driven by a computer program stored in a ROM 95 implementing the method of synchronization according to one embodiment of the invention.

At initialization, the code instructions of the computer program 95 are for example loaded into the RAM 93 and then executed by the processor of the processing unit 94. The processing unit 94 inputs a data stream, also called a transport stream.

The processor of the processing unit 94 implements the steps of the method of synchronization to reset the data stream to synchronize the different broadcasting sites of the network. To this end, the synchronization device comprises, in addition to the memory 93, a module for obtaining an absolute delay associated with the broadcasting site, a module for determining an additional delay, a module for resetting the data stream coming from the fixed transmitter and a module for obtaining a 1-pps type time reference. These modules are driven by the processor of the processing unit 94.

For example, such a synchronizing device is integrated into a broadcasting site.

If necessary, the synchronization device, the receiver and the transmitter of a broadcasting site can be combined within a same device.

FIG. 11 finally presents a broadcasting system implementing a head-end (according to the prior art or according to what is described above) and at least one broadcasting site as described above for the broadcasting of a data stream T2-MI according to the DVB-T2 standard.

On the head-end side, data to be broadcast are put into frames by a T2-MI gateway 113 delivering a data stream organized in frames. The temporal marking of the data frames can be implemented by the T2-MI gateway 113 using a 1-pps time reference and a 10 MHz frequency reference coming from a GPS receiver 114. As the case may be, the values of the absolute delays associated with the different broadcasting sites of the network are inserted into the data stream. In particular, the T2-MI gateway delivers a stream T2-MI comprising time stamps conveyed by packets of an (0x,20) type enabling the end of the frame to be determined.

The stream of data is then modulated by DVB-S2 modulator 115 and broadcast by means of a transmission network by satellite 116 up to at least one broadcasting site.

At a broadcasting site, the data stream is received by a DVB-S2 receiver 117 and then put at the disposal of a synchronization device 118 as described above enabling the resetting of the data stream and generating a 1-pps time reference and a 10 MHz frequency reference. The data stream thus reset is transmitted to a DVB-T2 modulator 1191 and broadcast by the antenna 1192 of the transmitter 119 in using the 1-pps time reference and 10 MHz frequency reference generated earlier.

The invention claimed is:

1. A method comprising:
   synchronizing data in a broadcasting network comprising at least one fixed transmitter and a plurality of broadcasting sites, wherein said synchronizing implements the following acts in at least one of said broadcasting sites:
   receiving a data stream transmitted by the fixed transmitter and comprising data transmitted to the plurality of broadcasting sites, at least one field carrying at least one delay associated with at least one of said plurality of broadcasting sites, called an absolute delay, determined by the fixed transmitter from a geographical position of said at least one broadcasting site or received by the fixed transmitter from the at least one broadcasting site, and at least one field carrying a fixed delay, said fixed delay being common to said plurality of broadcasting sites of said broadcasting network and corresponding to a maximum absolute delay determined from the geographical positions of said plurality of broadcasting sites;

determining an additional delay, by subtraction of said absolute delay of that broadcasting site from the fixed delay common to said broadcasting sites of said broadcasting network;

resetting the data stream coming from said fixed transmitter, applying said additional delay to at least one time information carried by said data stream or to at least one portion of said data stream, delivering a reset data stream; and obtaining a 1-pulse per second (pps) type time reference from said reset data stream synchronized with 1-pulse per second (pps) type time reference of the other broadcasting sites without use of a global positioning receiver in at least one of the broadcasting sites.

2. The method according to claim 1, wherein said absolute delay is equal to a travel time between said fixed transmitter and said broadcasting site and said fixed delay is equal to a maximum travel time among the travel times between said fixed transmitter and each of said broadcasting sites of said broadcasting network.

3. The method according to claim 1, wherein said absolute delay is equal to a travel time between an intermediate transmission device and said broadcasting site, and said fixed delay is equal to a maximum travel time among the travel times between said intermediate transmission device and each of said broadcasting sites of said broadcasting network.

4. The method according to claim 3, wherein said intermediate transmission device is a geostationary satellite.

5. The method according to claim 1, wherein said 1-pps type time reference obtained from said reset data stream is synchronous with a 1-pps type time reference coming from an external source.

6. The method according to claim 1, wherein said broadcasting sites belong to a same cell of a Single Frequency Network (SFN) type.

7. A data synchronization device capable of being activated in a broadcasting network comprising at least one fixed transmitter and a plurality of broadcasting sites, wherein said synchronization device comprises:

a processor; and a non-transitory computer-readable medium comprising instructions stored thereon, which when executed by the processor configure the data synchronization device to perform acts comprising:

receiving a data stream transmitted by the fixed transmitter and comprising data transmitted to the plurality of broadcasting sites, at least one field carrying at least one delay associated with at least one of said plurality of broadcasting sites, called an absolute delay, determined by the fixed transmitter from a geographical position of said at least one broadcasting site or received by the fixed transmitter from the at least one broadcasting site, and at least one field carrying a fixed delay, said fixed delay being common to said plurality of broadcasting sites of said broadcasting network and corresponding to a maximum absolute delay determined from the geographical positions of said plurality of broadcasting sites;

determining an additional delay of a respective broadcasting site, by subtraction of said absolute delay from said fixed delay common to said broadcasting sites of said broadcasting network;

resetting the data stream coming from said fixed transmitter, applying said additional delay to at least one time information carried by said data stream or to at least one portion of said data stream, delivering a reset data stream; and obtaining a 1-pulse per second (pps) type time reference from said reset data stream synchronized with 1-pulse per second (pps) type time reference of the other broadcasting sites without use of a global positioning receiver in at least one of the broadcasting sites.

8. A method for generating a data stream to be transmitted in a broadcasting network comprising a fixed transmitter and a plurality of broadcasting sites, wherein the method implements the following acts by the fixed transmitter:

computing at least one delay associated with at least one of said broadcasting sites, called an absolute delay, determined from a geographical position of said at least one broadcasting site, or receiving said absolute delay from the at least one broadcasting site;

receiving data to be transmitted to the plurality of broadcasting sites;

generating a data stream comprising the data and at least one field carrying said absolute delay and at least one field carrying a fixed delay, said fixed delay being common to said broadcasting sites of said broadcasting network and corresponding to a maximum absolute delay determined from the geographical positions of said broadcasting sites; and transmitting the data stream to the plurality of broadcasting sites, wherein the at least one field carrying said absolute delay and the at least one field carrying said fixed delay enable the plurality of broadcasting sites to generate synchronized 1-pulse per second (pps) type time references without use of global positioning receivers in at least one of the broadcasting sites.

9. The method for generating a data stream according to claim 8, further comprising the following acts:

obtaining a first time reference from an external source;

obtaining a second time reference determined from a first transmission/reception of said data stream;

comparing said first and second time references in order to determine a time offset between said first and second time references;

inserting said time offset, or at least one temporal marker modified as a function of said time offset, in said data stream so as to compensate for a variation of the transport time between said fixed transmitter and said broadcasting sites.

10. A device for generating a data stream to be transmitted in a broadcasting network comprising a fixed transmitter and a plurality of broadcasting sites, wherein the device is implemented at the fixed transmitter and comprises:

a processor; and a non-transitory computer-readable medium comprising instructions stored thereon, which when executed by the processor configure the data synchronization device to perform acts comprising:

computing at least one delay associated with at least one of said broadcasting sites, called an absolute delay, determined from a geographical position of said at least one broadcasting site, or receiving said absolute delay from the at least one broadcasting site;

receiving data to be transmitted to the plurality of broadcasting sites;

generating a data stream comprising the data and at least one field carrying the absolute delay and at least one field carrying a fixed delay, said fixed delay being common to said broadcasting sites of said broadcasting network and corresponding to a maximum absolute delay determined from the geographical positions of said the broadcasting sites; and transmitting the data stream to the plurality of broadcasting sites, wherein the at least one field carrying said absolute delay and the at least one field carrying said fixed delay enable the plurality of broadcasting sites to generate synchronized 1-pulse per second (pps) type time references without use of global positioning receivers in at least one of the broadcasting sites.

11. A non-transitory computer-readable medium comprising a computer program stored thereon and comprising instructions for implementing a method for synchronizing data in a broadcasting network comprising at least one fixed transmitter and a plurality of broadcasting sites, when the program is executed by a processor, wherein the method comprises the following acts in at least one of said broadcasting sites:

receiving a data stream transmitted by the fixed transmitter and comprising data transmitted to the plurality of broadcasting sites, at least one field carrying at least one delay associated with at least one of said plurality of broadcasting sites, called an absolute delay, determined by the fixed transmitter from a geographical position of said at least one broadcasting site or received by the fixed transmitter from the at least one broadcasting site, and at least one field carrying a fixed delay, said fixed delay being common to said plurality of broadcasting sites of said broadcasting network and corresponding to a maximum absolute delay determined from the geographical positions of said plurality of broadcasting sites;

determining an additional delay of that broadcasting site, by subtraction of said absolute delay from said fixed delay common to said broadcasting sites of said broadcasting network;

resetting the data stream coming from said fixed transmitter, applying said additional delay to at least one time information carried by said data stream or to at least one portion of said data stream, delivering a reset data stream; and obtaining a 1-pulse per second (pps) type time reference from said reset data stream synchronized with 1-pulse per second (pps) type time reference of the other broadcasting sites without use of a global positioning receiver in at least one of the broadcasting sites.

12. A non-transitory computer-readable medium comprising a computer program stored thereon and comprising instructions for implementing a method for generating a data stream to be transmitted in a broadcasting network comprising a fixed transmitter and a plurality of broadcasting sites, when the program is executed by a processor at the fixed transmitter, wherein the method implements the following acts:

computing at least one delay associated with at least one of said broadcasting sites, called an absolute delay, determined from a geographical position of said at least one broadcasting site, or receiving said absolute delay from the at least one broadcasting site;

receiving data to be transmitted to the plurality of broadcasting sites;

generating a data stream comprising the data and at least one field carrying said absolute delay and at least one field carrying a fixed delay, said fixed delay being common to said broadcasting sites of said broadcasting network and corresponding to a maximum absolute delay determined from the geographical positions of said broadcasting sites; and transmitting the data stream to the plurality of broadcasting sites, wherein the at least one field carrying said absolute delay and the at least one field carrying said fixed delay enable the plurality of broadcasting sites to generate synchronized 1-pulse per second (pps) type time references without use of global positioning receivers in at least one of the broadcasting sites.

* * * * *